Figure 1:
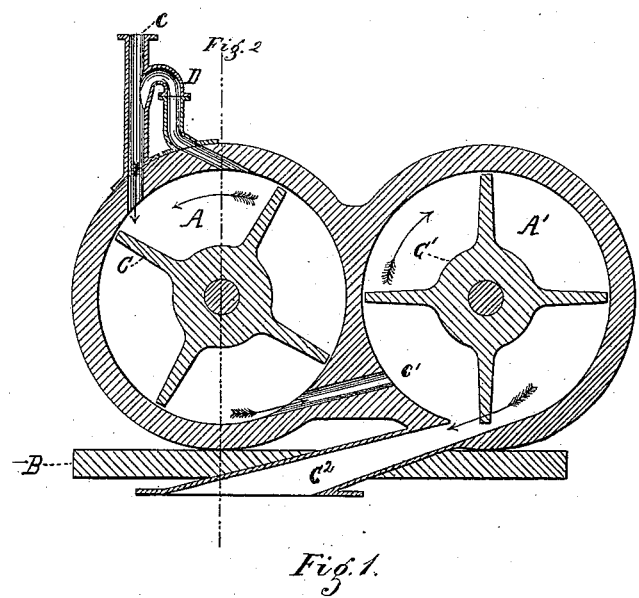

(No Model.)

C. W. RAMSAY.
APPARATUS FOR AGING AND PRESERVING DISTILLED AND FERMENTED LIQUIDS.

No. 313,236. Patented Mar. 3, 1885.

Witnesses:
John Barnett
Wm. H. Brown

Inventor:
Chas. W. Ramsay
By his attorney
M. Randolph

UNITED STATES PATENT OFFICE.

CHARLES W. RAMSAY, OF BROOKLYN, NEW YORK.

APPARATUS FOR AGING AND PRESERVING DISTILLED AND FERMENTED LIQUIDS.

SPECIFICATION forming part of Letters Patent No. 313,236, dated March 3, 1885.

Application filed August 20, 1883. (No model.)

*To all whom it may concern:*

Be it known that I, CHARLES W. RAMSAY, of the city of Brooklyn, in the county of Kings and State of New York, have invented a new and useful Improvement in Apparatus for Aging and Preserving Distilled and Fermented Liquids; and I hereby declare the following to be a full and clear description of the same.

This invention relates to an improvement on the machine invented heretofore by one Samuel C. Bruce, and secured to him by the United States Patents Nos. 86,640, 98,226, and 122,513, dated, respectively, February 9, 1869, December 28, 1869, and January 9, 1872. In each of the said machines there are used two cylindrical treating-chambers, having their outlets, respectively, in an upward vertical direction, a lateral direction, and a vertical downward direction, neither of which, as I have discovered, can produce an operative machine, and I have improved the said machine by constructing the outlet in a downwardly-sloping tangential line.

Other specific improvements in the said machine are illustrated in the drawings and described in the subjoined specification.

Figure 2:
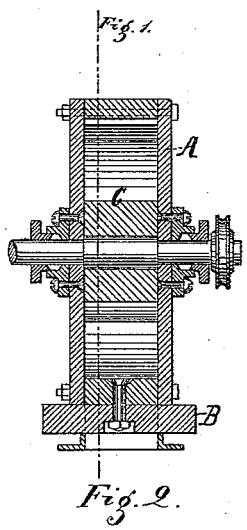

The accompanying drawings illustrate my improvement, and consist of Figure 1, which is a sectional elevation of the machine, showing the two treating-chambers cut in a plane crossing the cylinders; and Fig. 2, which is a transverse section through the first of said treating-chambers.

The two cylindrical treating-chambers A A' are mounted on a common bed-plate, B, and the said treating-chambers are respectively fitted with the rotary drivers or beaters C and C', which receive rotary motion from their shafts or axles, which extend outside of the ends of the cylinders for that purpose. These drivers or beaters are each formed of a central hub with radiating arms attached thereto. The chamber C is provided with an inlet-pipe, $c$, attached to it on its upper side, and an aperture or duct, $c'$, is made between the chambers C and C', to permit the material under treatment to pass from the first to the second chamber. The last, or chamber C', has an outlet-duct, $c^2$, and this last or outlet duct is made from the lowest part of chamber C', and is placed tangential to the said chamber. This feature is the important one of this invention, as the machines constructed by Bruce in the manner described in his patents have been found to be totally inoperative by reason of the defective outlets therein shown and described, and the tangential outlet $c^2$, proceeding from the lowest point of chamber C', is found to make the said machine operative. The reason of this is obvious.

The material to be treated is first introduced into the chamber C, and is driven around by its beaters until the aperture $c'$ is reached, which said aperture is tangential to the chamber C, and leading from it directly into the chamber C'. Through this aperture the material passes into the chamber C', and in it is carried around by its beaters until its outlet $c^2$ is reached; and if this outlet is placed tangential to the said chamber C' the centripetal action will carry the fluid out at that aperture; but if the said outlet is placed at any other point, or in any other position, the centrifugal action of the beaters will carry the fluid around with them, and the chambers will be gradually filled with a dense fluid and the machine will soon be stopped or "waterlogged" in this manner, and become wholly useless and inoperative, whereas with the downwardly-sloping tangential outlet the machine will constantly discharge and free itself, and the full benefit of the machine in atomizing and attenuating the fluid under treatment will be obtained. The motion of the beaters in these chambers is very rapid and drives the fluid against the cylindrical sides of the chambers with great force, and the action is to atomize the fluid material under treatment and break it up into an infinitely fine spray, and some of this spray is carried with the beaters to the upper part of the first chamber, and it must find an outlet or be carried down with the drivers and mingle with the incoming current from the inlet-pipe $c$. In order to provide this outlet, I introduce a tube or pipe, D, in the top part of the chamber C, and lead the said tube or pipe, in the first instance, tangentially from the highest part of said chamber C, then raise it a short distance vertically, and then curve it downwardly and lead it into and attach it to the inlet-pipe $c$, so that the escaping mist from C may mingle with the untreated fluid and not be lost, nor retard the flow of the fluid through the duct $c'$, as it otherwise would.

The construction of the tube or pipe D is clearly shown in Fig. 1.

The machine, constructed as above described, may be used with good effect to treat any fermented liquids—such as ale, beer, wines, &c.—to break up and kill any living organisms therein contained, and also to treat fermentable liquids in the same manner and for the same purpose. It may also be used with good effect to atomize distilled liquids—such as brandy, whisky, &c.—and improve and age the same by breaking up the oil-sacks supposed to exist therein and expose all atoms of the material to oxidation, and consequent aging.

I do not desire to be understood as claiming herein either of the processes covered by United States Letters Patent Nos. 243,156 and 243,157, granted to me June 21, 1881.

Having described my invention, I claim—

1. A pair of cylindrical treating-chambers, placed with their peripheries contiguous to each other, and connected by a lateral duct leading from near the bottom of the first chamber to near the central part of the second chamber, each chamber provided with a rotary beater consisting of radial or nearly radial arms, and the said treating-chambers entirely closed, except as to their inlet and outlet ducts, the outlet duct from the last of the treating-chambers opening downwardly from near the bottom of the last of the said treating-chambers and enlarging outwardly therefrom.

2. The vent-pipe D, attached to the upper part of the first cylinder, and leading therefrom to the inlet-pipe $c$, the said vent-pipe to be constructed and arranged as shown and described.

CHAS. W. RAMSAY.

Witnesses:
ALEXANDER LOWRY,
A. W. NIBŒTIUS.